United States Patent
Tsujino et al.

(10) Patent No.: US 7,486,484 B2
(45) Date of Patent: Feb. 3, 2009

(54) ARM CHAMFER FOR COMB TYPE ACTUATOR IN ROTATING DISK STORAGE DEVICE AND CARRIAGE ASSEMBLY

(75) Inventors: Hitoshi Tsujino, Kanagawa (JP); Hiroyasu Tsuchida, Kanagawa (JP); Hirokazu Tanizawa, Kanagawa (JP); Takeji Sumiya, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 481 days.

(21) Appl. No.: 11/290,652

(22) Filed: Nov. 29, 2005

(65) Prior Publication Data
US 2006/0114614 A1    Jun. 1, 2006

(30) Foreign Application Priority Data
Nov. 30, 2004    (JP)    ............................. 2004-345959

(51) Int. Cl.
*G11B 5/55* (2006.01)
(52) U.S. Cl. .................................................. 360/266
(58) Field of Classification Search .................. 360/266
See application file for complete search history.

(56) References Cited

U.S. PATENT DOCUMENTS

| | | | |
|---|---|---|---|
| 5,854,725 A | 12/1998 | Lee | |
| 6,366,432 B1* | 4/2002 | Tadepalli et al. | ............. 360/266 |
| 6,473,271 B1* | 10/2002 | Rahman et al. | ............. 360/266 |
| 6,597,540 B2* | 7/2003 | Tsuda et al. | ............. 360/265.9 |
| 2003/0016473 A1 | 1/2003 | Kim | |

* cited by examiner

*Primary Examiner*—A. J. Heinz
(74) *Attorney, Agent, or Firm*—Townsend and Townsend and Crew LLP; Rambod Nader

(57) ABSTRACT

A carriage assembly capable of suppressing flutter of actuator arms and magnetic disk is to be provided. In one embodiment, the carriage assembly comprises a first actuator arm having a windward side face, a leeward side face, an outer surface and an inner surface, and a second actuator arm having a windward side face, a leeward side face, a first inner surface opposed to the inner surface of the first actuator arm and a second inner surface positioned on the side opposite to the first inner surface. The first actuator arm is formed with a slant face extending from the windward side face toward the inner surface and the second actuator arm is formed with a slant face extending from the windward side face toward the first inner surface and a slant face extending from the windward side face toward the second inner surface.

17 Claims, 4 Drawing Sheets

(A)

(B)

ARM CHAMFER FOR COMB TYPE ACTUATOR IN ROTATING DISK STORAGE DEVICE AND CARRIAGE ASSEMBLY

CROSS-REFERENCES TO RELATED APPLICATIONS

This application claim priority from Japanese Patent Application No. JP2004-345959, filed Nov. 30, 2004, the entire disclosure of which is incorporated herein by reference.

BACKGROUND OF THE INVENTION

The present invention relates to a technique for suppressing oscillation of an actuator arm to improve a position controlling performance for a magnetic head in a rotating disk storage device such as a magnetic disk drive or a magneto-optical disk drive. More specifically, it relates to a technique for not only suppressing oscillation of an actuator arm but also suppressing flutter of a magnetic head to improve a position controlling performance for the magnetic head.

In a magnetic disk drive as an example of a rotating disk storage device, a head gimbal assembly (hereinafter referred to as "HGA") is attached to an actuator arm of a carriage, the carriage being driven by a voice coil motor (hereinafter referred to as "VCM") for pivotal movement. A head/slider composed of a magnetic head and a slider is attached to a front end of the HGA. An air bearing surface (hereinafter referred to as "ABS") is formed on the head/slider on the side opposed to a recording surface of a magnetic disk. The HGA comprises a spring structure called a flexure to which the head/slider is attached and a load beam which supports the flexure and which applies a pushing load to the head/slider.

When the ABS of the head/slider undergoes a lifting force from an air flow created on the recording surface of the rotating magnetic disk, the head/slider flies at a very slight height over the recording surface of the magnetic disk while being supported by the flexure and performing pivotal movement. Servo data are stored on the recording surface of the magnetic disk. A control unit calculates an error between a central position of a track and the present position thereof from the servo data read by the head and then controls an electric current to be fed to the VCM so that the head may be positioned to the center of the track. Oscillation or shock may be applied to the head, causing an unexpected displacement of the head, while the control unit performs a servo control of follow-up motion for the head. In this case, a longer time than necessary may be consumed until the head is positioned to a predetermined track or the head may perform a follow-up motion while moving with a large amplitude radially relative to the center of the track, thus making read or write difficult.

With the recent improvement in recording density of the magnetic disk drive, the accuracy required for positioning a head to a predetermined track is becoming more and more severe. While a head performs a track follow-up motion for read or write of data, an air flow created on a recording surface of a magnetic disk strikes against an actuator arm and its velocity changes. Upon occurrence of a change in air flow velocity in the vicinity of the actuator arm, oscillation occurs in the actuator arm and is transmitted to the HGA, thus affecting the head position control.

Displacement modes which occur during oscillation of the actuator arm include bending, sway, and torsion. Bending represents a displacement of the actuator arm in a direction perpendicular to the magnetic disk surface, sway represents a displacement in the pivoting direction of the actuator arm, and torsion represents a displacement in the direction of rotation around a center line which is imagined in the longitudinal direction of the actuator arm. Oscillation of the actuator arm caused by an air flow is herein termed flutter. As the rotational speed of the magnetic disk increases, the air flow velocity increases and the flutter in all of bending, sway and torsion modes increases. Furthermore, as the number of stacked magnetic disks is increased, that is, the number of actuator arms is increased, the influence of air flow on the entire carriage becomes more serious and the flutter further increases.

Patent Literature 1 (U.S. Pat. No. 5,854,725) discloses a technique wherein a guide member is attached to a side portion of an actuator arm to diminish the influence of an air flow created from a magnetic disk on the actuator arm. Patent Literature 2 (Published Patent Application US2003/0016473) discloses a technique wherein an actuator arm is tapered on its leeward side to diminish the formation of an eddy and thereby suppress oscillation of the actuator arm.

BRIEF SUMMARY OF THE INVENTION

To prevent the phenomenon that an air flow created on a recording surface of a rotating magnetic disk strikes against an actuator arm, causing flutter of the actuator arm, a guide member is provided on a windward side of the actuator arm or the actuator arm is tapered on its leeward side. These techniques are known in the art as referred to above. However, to improve the head positioning accuracy, it is necessary to suppress flutter not only of the actuator arm, but of the magnetic disk. The magnetic disk undergoes undulation which is attributable of unsatisfactory machining accuracy and mounting accuracy and also undergoes flutter under the influence of an air flow.

The actuator arm passes a position close to the recording surface of the magnetic disk when the head performs a seek operation. Therefore, upon collision of an air flow with the actuator arm and consequent change in the state of the air flow, a pressure variation is given to the magnetic disk, causing flutter of the disk. FIG. 5 shows a state in which actuator arms 1, 2 and 3 are present at positions close to two magnetic disks 4 and 5 which are rotating in the direction of arrows. Windward-side end portions of the actuator arms 1, 2 and 3 are tapered at 10, 11 and 12, respectively.

When air flows created on recording surfaces of the rotating magnetic disks change their courses at the corresponding tapered portions of the actuator arms, pressure is applied to the magnetic disks 4 and 5. More specifically, the tapered portion 10 of the actuator arm 1 applies a pressure in the direction of arrow 6 to the recording surface of the magnetic disk 4; the tapered portions 11 of the actuator arm 2 apply pressures in the directions of arrows 7 and 8 to the recording surfaces of the magnetic disks 4 and 5, respectively; and the tapered portion 12 of the actuator arm 3 applies a pressure in the direction of arrow 9 to the recording surface of the magnetic disk 5. The pressure directions 6 and 7 are a composite direction for the magnetic disk 4 and likewise the pressure directions 8 and 9 are a composite direction for the magnetic disk 5, thus causing flutter of both magnetic disks. Therefore, even if side portions of the actuator arms are tapered to diminish oscillation or flutter of the actuator arms themselves, it is impossible to ensure a high-degree of head positioning accuracy when flutter occurs in the magnetic disks due to air flow changes at the tapered portions.

It is a feature of the present invention to provide a magnetic disk drive capable of diminishing flutter which an actuator arm undergoes from an air flow created on a rotating recording medium and also capable of preventing the actuator arm itself from becoming a cause of flutter relative to a recording medium, thereby permitting improvement of the positioning accuracy in servo control.

In a first aspect of the present invention there is provided a rotating disk storage device comprising: a rotating disk recording medium having a first recording surface and a second recording surface; a first head gimbal assembly on which a head for making access to the first recording surface is mounted; a second head gimbal assembly on which a head for making access to the second recording surface is mounted; and a carriage including a first actuator arm for fixing the first head gimbals assembly, a second actuator arm for fixing the second head gimbal assembly, a coil support, and a voice coil held by the coil support; wherein the first actuator arm has an outer surface, a leeward side face, a windward side face, and an inner surface opposed to the first recording surface, the second actuator arm has an outer surface, a leeward side face, a windward side face, and an inner surface opposed to the second recording surface, and the first and second actuator arms each further have a slant face extending from the windward side face toward the leeward side face.

When the first and second actuator arms are provided for the recording medium, each of the actuator arms is formed with a slant or chamfered face extending from a windward side face thereof toward a leeward side face thereof. Therefore, it is possible to not only suppress flutter of each actuator arm itself but also prevent each actuator arm from becoming a cause of flutter against a magnetic disk. By setting the length of the region of the slant face at 10% or less of the width of the actuator arm it is possible to suppress flutter of the actuator arm itself and machining of the slant face is easy.

If the slant face is formed from a boundary between the windward side face and the outer surface toward the inner surface, it is possible to eliminate a windward side face against which an air flow strikes and therefore a smoother air flow can be formed on the windward side of each actuator arm. Forming the slant face while allowing a part of the windward side face to remain is preferable from the standpoint of easiness of machining, but setting the height of the windward side face at a value in the range of 20% to 80% of the thickness of the actuator arm is effective in suppressing flutter.

If the slant faces of the first and second actuator arms are formed in such a manner that a plane including the slant face formed in the first actuator arm and a plane including the slant face formed in the second actuator arm intersect each other on a central plane of the rotating disk type recording medium, it is possible to balance the pressure which an air flow having changed its course at the slant face of each actuator arm applies to the recording surface. This is advantageous to diminish flutter given to the magnetic disk by the actuator arm. A wiring fixing portion and wiring supported thereby are apt to cause flutter of each actuator arm. It is preferable to dispose them on the leeward side and form the slant face on the windward side. This is advantageous to suppress flutter of each actuator arm.

In a second aspect of the present invention there is provided a rotating disk storage device comprising: a first rotating disk recording medium having a first recording surface and a second recording surface; a second rotating disk recording medium spaced a predetermined distance from the first rotating disk recording medium; the second rotating disk recording medium having a third recording surface and a fourth recording surface; and a carriage assembly including a first actuator arm for fixing a first head gimbal assembly on which a head for making access to the first recording surface is mounted, a second actuator arm for fixing a second head gimbal assembly on which a head for making access to the second recording surface is mounted and also for fixing a third head gimbal assembly on which a head for making access to the third recording surface is mounted, a coil support, and a voice coil held by the coil support; wherein the first actuator arm has an outer surface, a windward side face, a leeward side face, and an inner surface opposed to the first recording surface, the second actuator arm has a windward side face, a leeward side face, a first inner surface opposed to the second recording surface, and a second inner surface opposed to the third recording surface, the first actuator arm further has a slant face extending from the windward side face toward the inner surface, and the second actuator arm further has a slant face extending from the windward side face toward the first and second inner surfaces.

In the case where two or more rotating disk type recording media are stacked, the second actuator arm is adopted as an actuator arm structure disposed between adjacent such recording media. For the outermost recording surface, the third actuator arm is disposed in symmetric relation to the first actuator arm with respect to a central plane in the height direction of the stack of magnetic disks. According to such a construction it is possible to suppress both flutter of the actuator arms and that of the magnetic disks even if the number of magnetic disks increases.

According to the present invention it is possible to provide a magnetic disk drive capable of diminishing flutter which each actuator arm undergoes from an air flow created by a rotating recording medium and capable of preventing each actuator arm from becoming a cause of flutter of the recording medium, thereby improving the positioning accuracy in servo control. Further, it is possible to provide a carriage assembly suitable for such a magnetic disk drive.

DETAILED DESCRIPTION OF THE INVENTION

Construction of Magnetic Disk Drive

Figure 1:
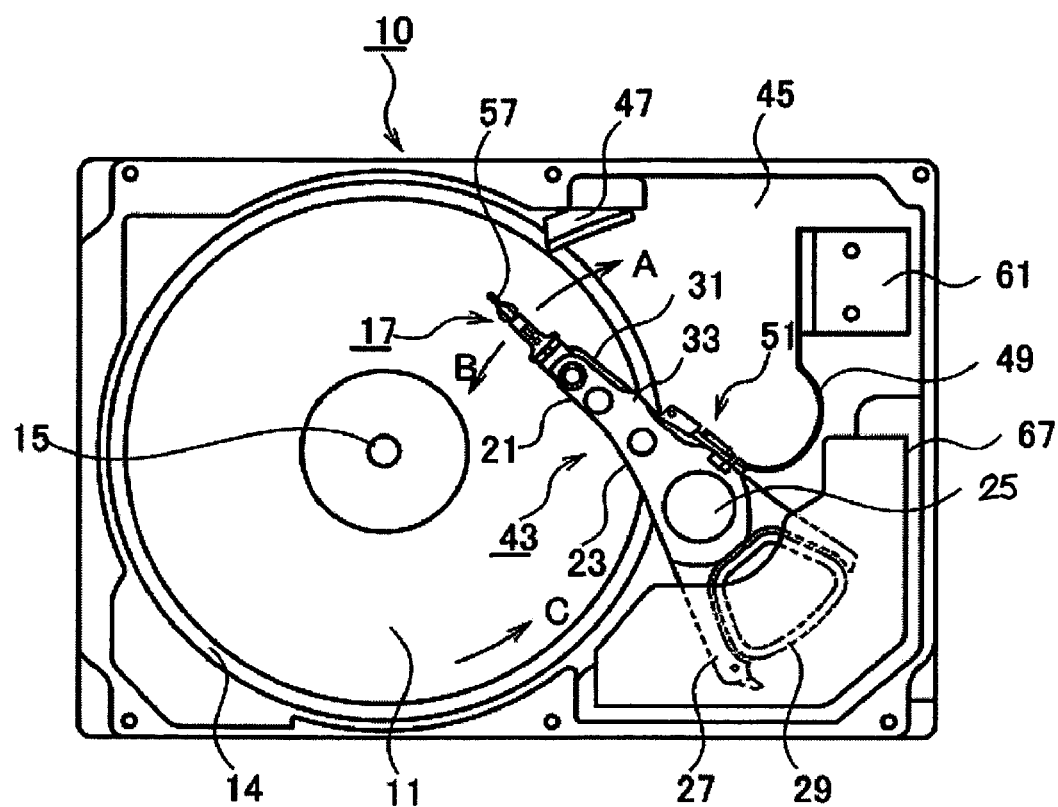
FIG. 1 is a schematic plan view of a magnetic disk drive according to an embodiment of the present invention.

FIG. 1 is a schematic plan view of a magnetic disk drive according to an embodiment of the present invention. FIG. 2(A) is a perspective view showing a principal portion of a carriage assembly, and FIG. 2(B) is a detailed view of a slit. The magnetic disk drive 10 includes various constituent elements accommodated within a base 45. A magnetic disk stack 11 as recording media is composed of two magnetic disks 11a and 11b (neither shown) each having recording surfaces as both surfaces thereof. The magnetic disks are spaced at a predetermined distance from each other and fixed to a spindle hub. The magnetic disks 11a and 11b are driven by a spindle motor disposed at the bottom of the magnetic disk stack 11 and rotate together in the direction of arrow C around a spindle shaft 15.

In the two magnetic disks, an upper and lower magnetic disks are hereinafter denoted by 11a and 11b, respectively, as required. On each recording surface a plurality of concentric data tracks are defined by servo data stored in servo sectors. The servo sectors are arranged radially from the innermost track toward the outermost track on each recording surface so as to be spaced apart at a predetermined angle in the circumferential direction. Each servo data contains track identification information and a burst pattern as a head positioning signal, and provides a signal for seek and following operations to a control unit.

The magnetic disk drive 10 has head/slider units each consisting of a head and a slider. The head/slider units are associated with the four respective recording surfaces. Each head/slider is fixed to a flexure. The flexure is fixed to a suspension assembly composed of a load beam and a hinge to form a head gimbal assembly (hereinafter referred to as "HGA") 17. The head gimbal assembly includes a wiring structure 31 connected to a magnetic head. A merge lip 57 is formed at a distal end of the HGA.

The carriage assembly 23 includes an actuator arm 21, a coil support 27 and a voice coil 29, and a pivot aperture 25 for insertion therein of a pivot cartridge is formed centrally of the carriage assembly. The actuator arm 21 comprises three actuator arms 21a, 21b and 21c which are stacked at predetermined spacings. The three actuator arms 21a, 21b and 21c are rendered integral at a peripheral portion of the pivot aperture 25.

The portion of the carriage assembly which portion is separate from the vicinity of the pivot aperture 25 is herein generically termed the actuator arm 21, provided individual actuator arms will be referred to as 21a, 21b and 21c respectively. The HGA 17 is fixed by swaging to each actuator arm in a swaging hole 19. The HGA associated with the upper recording surface of the magnetic disk 11a is fixed to the top actuator arm 21a, the HGA associated with the lower recording surface of the magnetic disk 11a and also to the upper recording surface of the magnetic disk 11b is fixed to the middle actuator arm 21b, and the HGA associated with the lower recording surface of the magnetic disk 11b is fixed to the bottom actuator arm 21c. The actuator arms 21a to 21c are respectively formed with slits 33a to 33c adaptable for fixing the wiring structures 31 of the associated HGAs. In FIG. 2(B), the structures of the slits 33a to 33c are typified by a slit 33. As shown in the same figure, the slit 33 is constituted as a groove 34 formed in a side face of an actuator arm. Each wiring structure 31, which is in a flat shape, is inserted into the groove 34 and is thereby fixed to the actuator arm.

A base coil yoke 67 is mounted to the base 45 so as to cover the voice coil 29 from above, and a voice coil magnet is affixed to a lower surface of the voice coil yoke 67. The voice coil 29, the voice coil yoke 67 and the voice coil magnet constitute a principal portion of a voice coil motor (hereinafter referred to as "VCM"). These causes the suspension assembly to move pivotally in the direction of arrow A or B about a pivot shaft 55 at the time of performing a seek operation, thereby positioning each magnetic head to a predetermined cylinder of the magnetic disk associated therewith.

A relay terminal board 51 is provided in the carriage assembly 23 to connect wiring connected to each magnetic head with a flexible printed circuit board (FPC) 49 connected to an external terminal 61. The magnetic disk drive 10 is provided with a ramp 47 at a position outside the outer periphery of the magnetic disk 11 so that the merge lip 57 can engage the ramp, thereby realizing a load/unload system. The magnetic disk drive 10 is provided with a circuit board having mounted thereon a read/write channel, a control unit, a power supply/driver, a hard disk controller, and a buffer memory. The circuit board is connected to the FPC 49 via the external terminal 61 which is mounted to the outside of the base 45. The combination of the HGA 17 and the carriage assembly is termed a head stack assembly (hereinafter referred to as "HSA") 43.

The actuator arm 21 is formed slightly curvilinearly sideways in its longitudinal direction. This is for the following reason. In the event a strong impact force is applied from the exterior when the HSA 43 is unloaded off the magnetic disk back onto the ramp 47, a plane of projection of the actuator arm should not be present on the magnetic disk lest the disk should strike oscillationwise against the HSA 43. That a longitudinal side face of the actuator arm in the carriage assembly according to the present invention is curvilinear is not essential to the present invention, but it may be formed rectilinearly. For the slit 33 in the actuator arm, generally in the case of such a construction of HSA consisting of HGA and carriage assembly, the wiring structure is passed sideways of the actuator arm. Passing the wiring structure along the lower surface of the actuator arm is not preferable because of an increase in height of the magnetic disk stack. In this case, if a slit is formed in a leeward side face of the actuator arm illustrated in FIG. 3 and the structure of the actuator arm which is characteristic in the present invention is provided on a windward side face, there accrues an advantage in point of suppressing flutter of the actuator arm and that of the magnetic disk.

Sectional Structure of Actuator Arm

Figure 2:
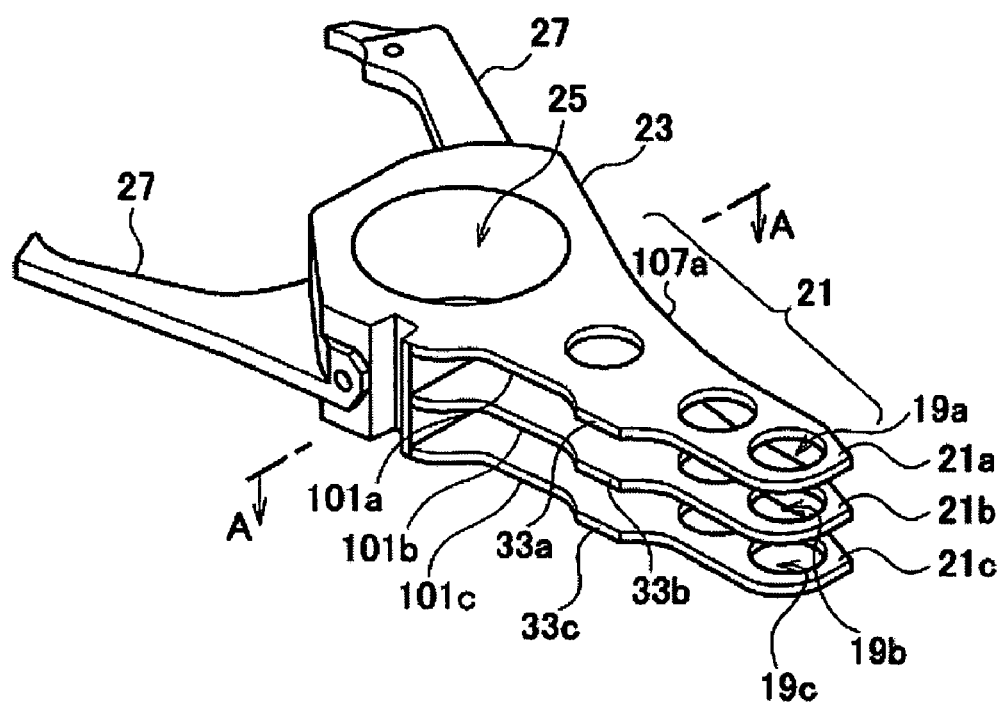
FIG. 2(A) is a perspective view showing a principal portion of a carriage assembly.
FIG. 2(B) is a detailed view of a slit.
Figure 2:
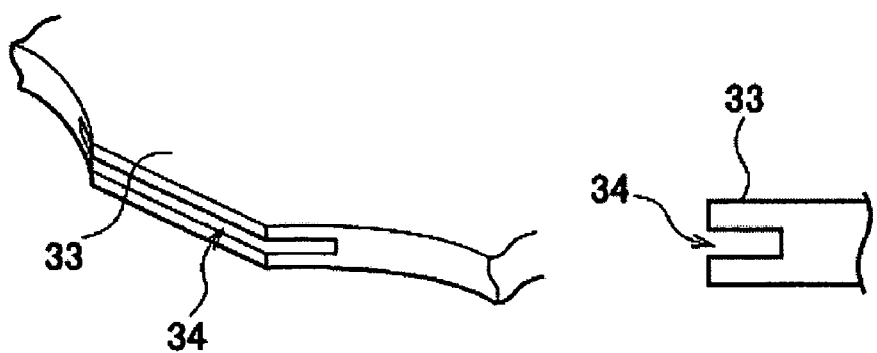
Figure 3:
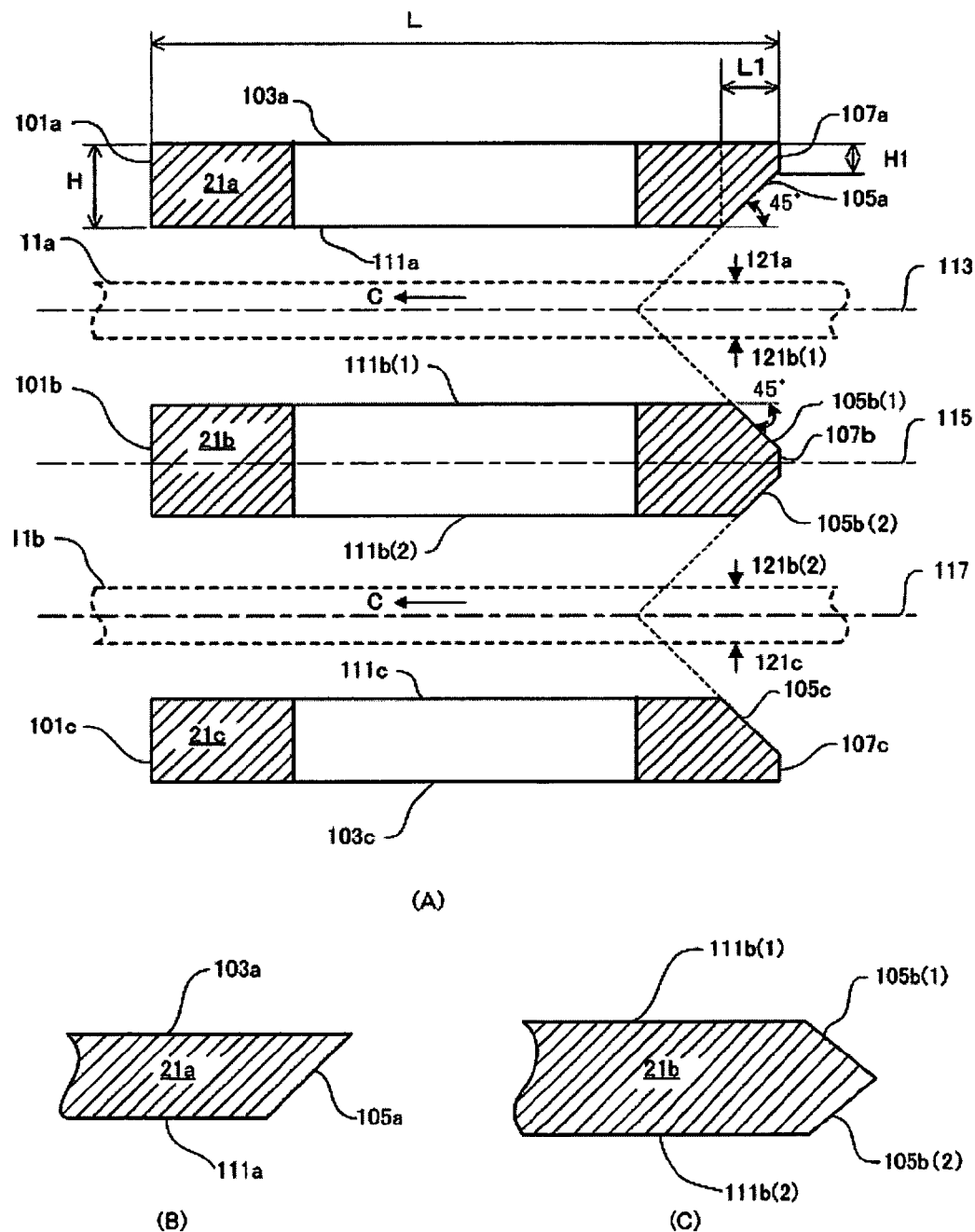
FIG. 3(A) is a sectional view of actuator arms taken on line A-A in FIG. 2(A) and as viewed from a swaging hole 19.
FIG. 3(B) is a partial sectional view showing a slant face formed on an actuator arm.
FIG. 3(C) is another partial sectional view showing slant faces formed on an actuator arm.

FIG. 3 is a cross-sectional view of the actuator arms taken along arrow A-A in FIG. 2, as viewed from the swaging hole 19. The actuator arms 21a, 21b and 21c are spaced at a predetermined distance from one another so that they can each move pivotally between adjacent magnetic disks for seek motion. In FIG. 3, the magnetic disks 11a and 11b neither shown in FIG. 1 are shown imaginarily as positions which they assume when both carriage assembly 23 and magnetic disk stack 11 are mounted to the base 45. The rotating direction of the magnetic disks 11a and 11b is the direction of arrow C and air flows also run in the arrow C direction along the surfaces of the magnetic disks.

The actuator arm 21a includes a leeward side face 101a, an outer surface 103a, a windward side face 107a and an inner surface 111a. The outer surface 103a is opposed to a base cover which covers the base when the HSA 43 is mounted to the base. The inner surface 111a is opposed to the upper recording surface of the magnetic disk 111a when the HSA 43 is mounted to the base 45. The windward side face 107a undergoes wind pressure of an air flow created on the recording surface of the magnetic disk 11a which is rotating in the direction of arrow C when the HSA 43 mounted to the base 45 performs seek motion. The leeward side face 101a is another side face which, like the windward side face 107a, is a constituent of longitudinal side faces of the actuator arm. In this embodiment, the slit 33 is formed in the leeward side face 101a.

The section of the actuator arm 21a, before molding into the shape shown in FIG. 3, is formed in a rectangular shape which is defined by the leeward side face 101a, outer surface 103a, windward side face 107a and inner surface 111a. At the windward side face 107a there is formed a slant or chamfered face 105a which slants from the windward side face 107a and the inner surface 111a in such a manner as to cut off an angle of 90° formed by the windward side face 107a and the inner surface 111a. The slant face 105a is formed throughout the whole of the windward side face 107a in the longitudinal direction of the actuator arm 21a, but according to the idea of the present invention it is not always necessary to form the slant face 105*a* throughout the whole.

Although the slant face 105*a* in this embodiment is formed at an angle of about 45° relative to a plane including the inner surface 111*a*, the idea of the present invention is not limited thereto. The width of the actuator arm 21*a* is shown as a rectilinear distance L between the windward side face 107*a* and the leeward side face 101*a*. A rectilinear distance L1 on the outer surface extending from the windward side face 107*a* toward the leeward side face 101*a* is the distance up to the position where the slant face 105*a* intersects the inner surface 111*a*. The rectilinear distance L1 will hereinafter be referred to as the length of the region of the slant face 105*a*.

In this embodiment, the length L1 of the region of the slant face relative to the width L of the actuator arm is set at about 10% or less. The width L of the actuator arm differs depending on a longitudinal position of the actuator arm 21*a*. In addition, the length L1 of the region of the slant face is set at about 10% or less of the width of the actuator arm at any position. This makes it easy to effect machining of the slant face and makes it possible to attain a satisfactory effect in the prevention of flutter of the actuator arm. The length L1 of the region of the slant face relative to the width L of the actuator arm may be selected in the range of about 2% to 10%.

As shown in FIG. 3(B), the slant face 105*a* may be formed from the boundary between the windward side face 107*a* and the outer surface 103*a* toward the inner surface 111*a* so that the windward side face 107*a* does not remain. However, the strength of the actuator arm is deteriorated at the boundary portion between the slant face 105*a* and the outer surface 103*a* and so there sometimes occurs a case where it is difficult to effect machining into the illustrated shape. It is necessary to pay attention to this point. In this embodiment, the height H1 of the windward side face is set at a value in the range of about 20% to 80% of the thickness H of the actuator arm.

The actuator arm 21*b* includes a leeward side face 101*b*, an inner surface 111*b*(1), a windward side face 107*b* and an inner surface 111*b*(2). The inner surface 111*b*(1) is opposed to the lower recording surface of the magnetic disk 11*a* when the HSA 43 is mounted to the base 45. The inner surface 111*b*(2) is opposed to the upper recording surface of the magnetic disk 11*b* when the HSA 43 is mounted to the base 45. The windward side face 107*b* undergoes wind pressures of air flows created on the recording surfaces of the magnetic disks 11*a* and 11*b* which are rotating in the direction of arrow C when the HSA 43 mounted to the base 45 performs a seek motion. The leeward side face 101*b* is another side face which, like the windward side face 107*b*, is a constituent of longitudinal side faces of the actuator arm 21*b*. As is the case with the actuator arm 21*a*, a slit 33 is formed in the leeward side face The section of the actuator arm 21*b*, before molding into the shape shown in FIG. 3, is formed in a rectangular shape which is defined by the leeward side face 101*b*, inner surface 111*b*(1), windward side face 107*b* and inner surface 111*b*(2). At the windward side face 107*b* there is formed a slant or chamfered face 105*b*(1) which slants from the windward side face 107*b* to the inner surface 111*b*(1) in such a manner as to cut off an angle of 90° formed by the windward side face 107*b* and the inner surface 111*b*(1). At the windward side face 107*b* is also formed a slant face 105*b*(2) in symmetric relation to the slant face 105*b*(1) with respect to a central plane 115 in the thickness direction of the actuator arm 21*b*. The slant faces 105*b*(1) and 105*b*(2) are formed throughout the whole of the windward side face 107*b* in the longitudinal direction of the actuator arm 21*b*, but according to the idea of the present invention it is not always necessary to form both slant faces throughout the whole as is the case with the actuator arm 21*a*.

The slant faces 105*b*(1) and 105*b*(2) in this embodiment are formed at an angle of about 45° relative to a plane including the inner surface 111*b*(1) and a plane including the inner surface 111*b*(2), respectively. For the same reason as that stated in connection with the actuator arm 21*a*, the length L1 of the region of each slant face is set at about 10% or less of the width of the actuator arm 21*b* at any position. The length L1 of the slant face region relative to the width L of the actuator arm 21*b* can be selected in the range of about 2% to 10%. When the HSA 43 and the magnetic disk stack 11 are mounted to the base 45, planes including the slant faces 105*a* and 105*b* intersect each other on a central plane 113 of the magnetic disk 11*a*. So defining the relation among the actuator arm 21*a*, the magnetic disk 11*a* and the actuator arm 21*b* is advantageous to offset the influence of air flows striking against the slant faces 105*a* and 105*b*(1) on the magnetic disk 11*a*. As shown in FIG. 3(C), the slant faces 105*b*(1) and 105*b*(2) may be formed from the boundary between the central plane 115 in the thickness direction of the actuator arm 21*b* and the windward side face toward the inner surface 111*b*(1) or 111*b*(2) so that the windward side face 107*b* does not remain.

The actuator arm 21*c* includes a leeward side face 101*c*, an outer surface 103*c*, a windward side face 107*c* and an inner surface 111*c*. The outer surface 103*c* is opposed to the bottom of the base 45 with the HSA 43 attached to the base. The inner surface 111*c* is opposed to the lower recording surface of the magnetic disk 11*b* with the HSA 43 attached to the base 45. The windward side face 107*c* undergoes wind pressure of an air flow created on the surface of the magnetic disk 11*b* which is rotating in the direction of arrow C when the HSA 43 is mounted to the base and the magnetic head is positioned to a predetermined track. The leeward side face 101*c* is another side face which, like the windward side face 107*c*, is a constituent of longitudinal side faces of the actuator arm, and is formed with a slit 33. Other features of the actuator arm 21*c* can be understood by reference to the description given above in connection with the actuator arm 21*a*.

Figure 4:
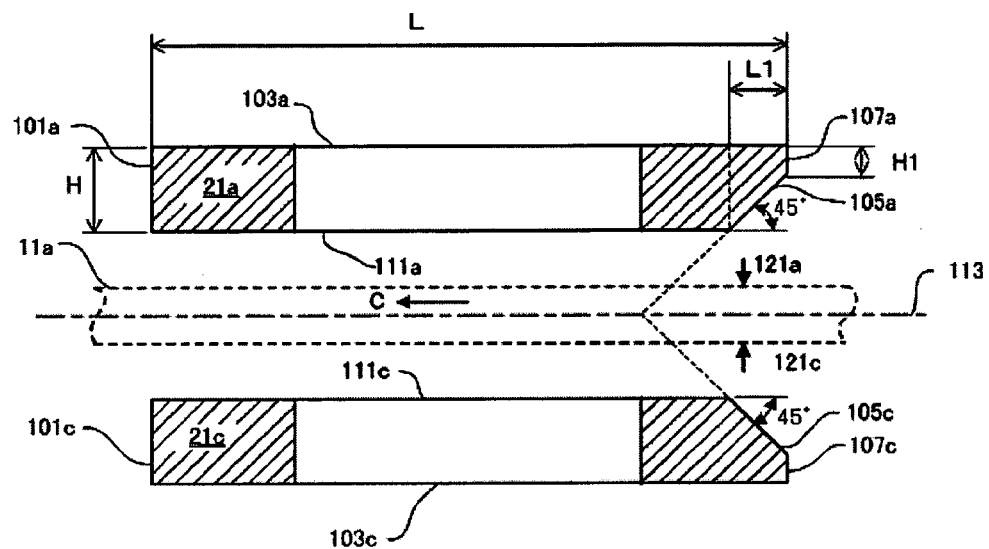
FIG. 4 illustrates another embodiment of actuator arms.
Figure 5:
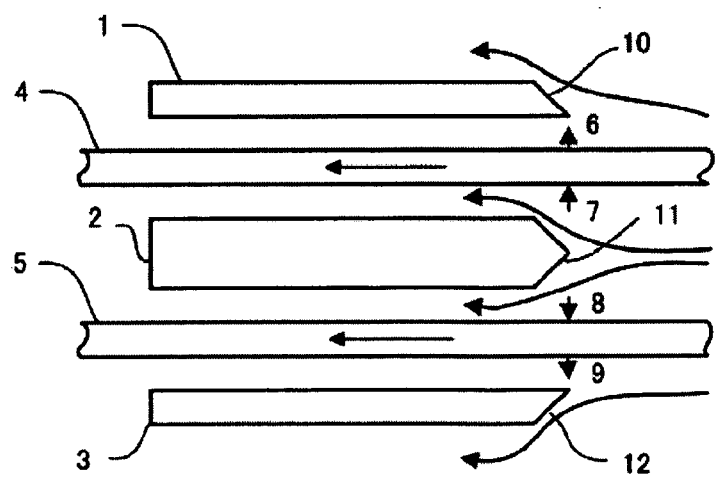
FIG. 5 illustrates how air flows striking against actuator arms exert an influence on magnetic disks.

In the case where the number of magnetic disks in the magnetic disk stack 11 further increases, the effects of the present invention can be attained by increasing the number of the actuator arm 101*b*. In the case of only the magnetic disk 11*a* shown in FIG. 3, the carriage assembly is constructed in such a manner that the inner surface 111*a* of the actuator arm 21*a* is opposed to the upper recording surface of the magnetic disk 11*a* and the inner surface 111*c* of the actuator arm 21*c* is opposed to the lower recording surface of the magnetic disk 11*a*, as shown in FIG. 4. According to this construction it is possible to suppress flutter of the actuator arms themselves and also prevent the actuator arms from becoming a cause of flutter of the magnetic disk.

For the carriage assembly 23, a plurality of carriage assemblies are fabricated by machining a rod-like stock of the same section obtained by extrusion of molten aluminum. The rod-like carriage stock formed by the extrusion is subjected to external finishing work to form leeward and windward side faces as finished side faces. Then a plurality of sharp-edge milling cutters called gang cutters are arranged with a high-degree of accuracy and cutting work is performed from both right and left sides simultaneously to form actuator arms. At this time, cutting traces of the sharp-edge milling cutters become inner or outer surfaces.

Actuator arms each having a rectangular section are thus formed from the rod-like stock by means of the sharp-edge milling cutters. The cutters are then replaced with chamfering sharp-edge milling cutters, followed by cutting to form slant faces of the actuator arms simultaneously. The chamfering milling cutters have a shape permitting the formation of slant faces of 45° in the actuator arms formed from the rod-like stock and their cutting traces become slant faces.

Next, the following description is now made of how the actuator arms shown in FIG. 3 operate as part of the HSA 43 and as a constituent element of the magnetic disk drive 10. When the HSA 43 performs a seek motion or a track following motion for the magnetic disk stack 11, an air flow created on the recording surface of the corresponding magnetic disk strikes against the windward side face of each actuator arm. Since the windward side face of each actuator arm is formed with a slant face, the greater part of the air flow on the windward side face advances smoothly toward the inner surface, so that there is little oscillation acting on the actuator arm.

That is, it is possible to mitigate the state such that oscillation of each actuator arm resulting from collision therewith of an air flow transfers to the associated magnetic head the via the HGA with consequent deterioration of accuracy in servo control. Since the slant face is formed on the windward side face of each actuator arm and the slit and wiring structure are formed on the leeward side face, disturbance of air flow caused by the wiring structure does not occur on the windward side face. The air flow which has struck against the slant face 105*a* applies pressure to the upper recording surface of the magnetic disk 11*a* in the direction of arrow 121*a*, while the air flow which has struck against the slant face 105*b*(1) applies pressure to the lower recording surface of the magnetic disk 11*a* in the direction of arrow 121*b*.

The angle of the slant faces 105*a* and 105*b*(1) relative to the magnetic disk 11*a* is set so that extending planes from the slant faces intersect each other on the central plane 113 in the thickness direction of the magnetic disk 11*a*, so that pressures 121*a* and 121*b*(1) are offset. Consequently, it is possible to lighten the degree of occurrence of flutter which results from the application of pressure to the magnetic disk 11*a* by an air flow striking against the actuator arm. This is also true of the relation between the slant faces 105*b*(2) and 105*c* for the magnetic disk 11*b*. It is possible to not only diminish flutter of the actuator arm itself but also suppress the actuator arm from becoming a cause of flutter of the magnetic disk 11*b*.

In connection with the structure shown in FIG. 3, a carriage assembly having a slant face and a carriage assembly not having a slant face were provided and allowed to perform a track following motion. As a result, the degree of deviation of a magnetic head from a track center while being servo-controlled under positional variation relative to the track center was about 7% narrower in the carriage assembly having the slant face. Thus, it was possible to confirm the effectiveness of the actuator arm structure according to the present invention.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A rotating disk storage device comprising:
    a rotating disk recording medium having a first recording surface and a second recording surface;
    a first head gimbal assembly on which a head for making access to said first recording surface is mounted;
    a second head gimbal assembly on which a head for making access to said second recording surface is mounted; and
    a carriage including a first actuator arm for fixing said first head gimbal assembly, a second actuator arm for fixing said second head gimbal assembly, a coil support, and a voice coil held by said coil support;
    wherein said first actuator arm has an outer surface, a leeward side face, a windward side face, and an inner surface opposed to said first recording surface, said second actuator arm has an outer surface, a leeward side face, a windward side face, and an inner surface opposed to said second recording surface, and said first and second actuator arms each further have a slant face extending from said windward side face toward said leeward side face, and
    wherein, in each of said first and second actuator arms, said leeward side face is formed with a wiring fixing portion for fixing wiring connected to an associated one of said heads.

2. A rotating disk storage device according to claim 1, wherein, in each of said first and second actuator arms, a length of the region of said slant face is about 10% or less of a width of the actuator arm.

3. A rotating disk type storage device according to claim 1, wherein, in each of said first and second actuator arms, said slant face is formed so as to extend from a boundary between said windward side face and said outer surface toward said inner surface.

4. A rotating disk type storage device according to claim 1, wherein a height of said windward side face is in a range of about 20% to 80% of a thickness of each of said first and second actuator arms.

5. A rotating disk type storage device according to claim 1, wherein a plane including the slant face formed in said first actuator arm and a plane including the slant face formed in said second actuator arm intersect each other on a central plane of said rotating disk recording medium.

6. A rotating disk storage device comprising:
    a first rotating disk recording medium having a first recording surface and a second recording surface;
    a second rotating disk recording medium spaced at a predetermined distance from said first rotating disk recording medium, said second rotating disk recording medium having a third recording surface and a fourth recording surface; and
    a carriage assembly including a first actuator arm for fixing a first head gimbal assembly on which a head for making access to said first recording surface is mounted, a second actuator arm for fixing a second head gimbal assembly on which a head for making access to said second recording surface is mounted, and also for fixing a third head gimbal assembly on which a head for making access to said third recording surface is mounted, a coil support, and a voice coil held by said coil support;
    wherein said first actuator arm has an outer surface, a windward side face, a leeward side face, and an inner surface opposed to said first recording surface;
    wherein said second actuator arm having a windward side face, a leeward side face, a first inner surface opposed to said second recording surface, and a second inner surface opposed to said third recording surface;
    wherein said first actuator arm further has a slant face extending from said windward side face toward said inner surface; and
    wherein said second actuator arm further has a first slant face extending from said windward side face toward said first inner surfaces, and a second slant face extending from said windward side face toward said second inner surface, and wherein, in each of said first, second and third actuator arms, said leeward side face is formed with a wiring fixing portion for fixing wiring connected to the associated one of said heads.

7. A rotating disk storage device according to claim 6, wherein said carriage assembly further includes a third actuator arm for fixing a fourth head gimbal assembly on which a head for making access to said fourth recording surface is mounted;

wherein said third actuator arm has an outer surface, a windward side face, a leeward side face, and an inner surface opposed to said fourth recording surface;

wherein said third actuator arm further has a slant face extending from said windward side face toward said inner surface.

8. A rotating disk storage device according to claim 6, wherein, in each of said first and second actuator arms, a length of the region of said slant face is about 10% or less of a width of the actuator arm.

9. A rotating disk storage device according to claim 6, wherein, in said first actuator arm, said slant face is formed so as to extend from near a boundary between said windward side face and said outer surface toward said inner surface, while in said second actuator arm, said first slant face is formed so as to extend from near a boundary between said windward side face and a central plane of the second actuator arm toward said inner surface.

10. A rotating disk storage device according to claim 6, wherein a plane including the slant face formed in said first actuator arm and a plane including the first slant face formed in said second actuator arm intersect each other on a central plane of said first rotating disk recording medium.

11. A carriage assembly for supporting a head gimbal assembly in a magnetic disk drive, comprising:

a first actuator arm having an outer surface and an inner surface;

a second actuator arm having an outer surface and an inner surface opposed to the inner surface of said first actuator arm;

each of said first and second actuator arms also having a windward side face and a leeward side face; and a coil support;

wherein each of said first and second actuator arms further has a slant face formed so as to extend from said windward side face toward said inner surface and each of said leeward faces is formed with a wiring fixing portion for fixing wiring connected to a head.

12. A carriage assembly according to claim 11, further comprising a voice coil held by said coil support.

13. A carriage assembly for supporting a head gimbal assembly in a magnetic disk drive, comprising:

a first actuator arm having a windward side face, a leeward side face, an outer surface and an inner surface;

a second actuator arm having a windward side face, a leeward side face, a first inner surface opposed to the inner surface of said first actuator arm, and a second inner surface positioned on the side opposite to said first inner surface; and a coil support;

wherein said first actuator arm further has a slant face formed so as to extend from said windward side face toward said inner surface; and said second actuator arm further has a first slant face formed so as to extend from said windward side face toward said first inner surface and a second slant face formed so as to extend from said windward side face toward said second inner surface, and wherein, in each of said first, second and third actuator arms, said leeward side face is formed with a wiring fixing portion for fixing wiring connected to the associated one of said heads.

14. A carriage assembly according to claim 13, further comprising a third actuator arm having a windward side face, a leeward side face, an outer surface, and an inner surface opposed to said second inner surface, said third actuator arm further having a slant face formed so as to extend from said windward side face toward said inner surface.

15. A carriage assembly according to claim 13, wherein, in each of said first and second actuator arms, a length of said slant face is about 10% or less of a width of the actuator arm.

16. A carriage assembly according to claim 15, wherein, in each of said first and second actuator arms, a height of said windward side face is in a range of about 20% to 80% of a thickness of the actuator arm.

17. A carriage assembly according to claim 13, wherein, in said first actuator arm, said slant face is formed so as to extend from near a boundary between said windward side face and said outer surface toward said inner surface, while in said second actuator arm, said first slant face is formed so as to extend from near a boundary between said windward side face and a central plane of the second actuator arm toward said inner surface.

* * * * *